United States Patent [19]
Yano

[11] Patent Number: 5,499,122
[45] Date of Patent: Mar. 12, 1996

[54] PLASMA-ADDRESSED LIQUID CRYSTAL DISPLAY DEVICE HAVING A TRANSPARENT DIELECTRIC SHEET WITH A POROUS LAYER CONTAINING AN IMPREGNATED LIQUID CRYSTAL

[75] Inventor: Tomoya Yano, Kanagawa, Japan

[73] Assignee: Sony Corporation, Tokyo, Japan

[21] Appl. No.: 238,052

[22] Filed: May 4, 1994

[30]    Foreign Application Priority Data

May 7, 1993   [JP]   Japan ..................................... 5-131459

[51] Int. Cl.⁶ ................................................. G02F 1/1353
[52] U.S. Cl. ................................ 359/54; 359/52; 359/51
[58] Field of Search .................................. 359/54, 52, 51

[56]            References Cited

U.S. PATENT DOCUMENTS

| | | | |
|---|---|---|---|
| 3,794,405 | 2/1974 | Masi | 350/160 |
| 4,898,454 | 2/1990 | Buckley et al. | 359/52 |
| 4,933,111 | 6/1990 | Buckley et al. | 359/51 |
| 5,214,521 | 5/1993 | Kwon et al. | 359/54 |
| 5,221,979 | 6/1993 | Kim | 359/54 |
| 5,349,455 | 9/1994 | Hayashi et al. | 359/54 |
| 5,351,144 | 9/1994 | Tanamachi | 359/54 |

OTHER PUBLICATIONS

IEEE Circuits and Devices, No. 5, Sep. 1990, Thomas S. Buzak, "Plasma Addressing for Flat-Panel Displays", pp. 14–17.

*Primary Examiner*—James B. Mullins
*Assistant Examiner*—James A. Dudek
*Attorney, Agent, or Firm*—Hill, Steadman & Simpson

[57]                ABSTRACT

A plasma-addressed liquid crystal display device comprises a built-up structure including an upper glass substrate, a transparent dielectric sheet brought into intimate contact with the upper substrate, and a lower glass substrate disposed in direct face-to-face contact with the dielectric sheet. The upper glass substrate has a plurality of data electrodes extending along one direction on the inner surface thereof. A plurality of discharge channels extending along a direction intersecting the one direction is formed between the lower side of the dielectric sheet and the lower glass substrate. The transparent dielectric sheet has a porous layer containing an impregnated liquid crystal in an upper portion thereof.

5 Claims, 5 Drawing Sheets

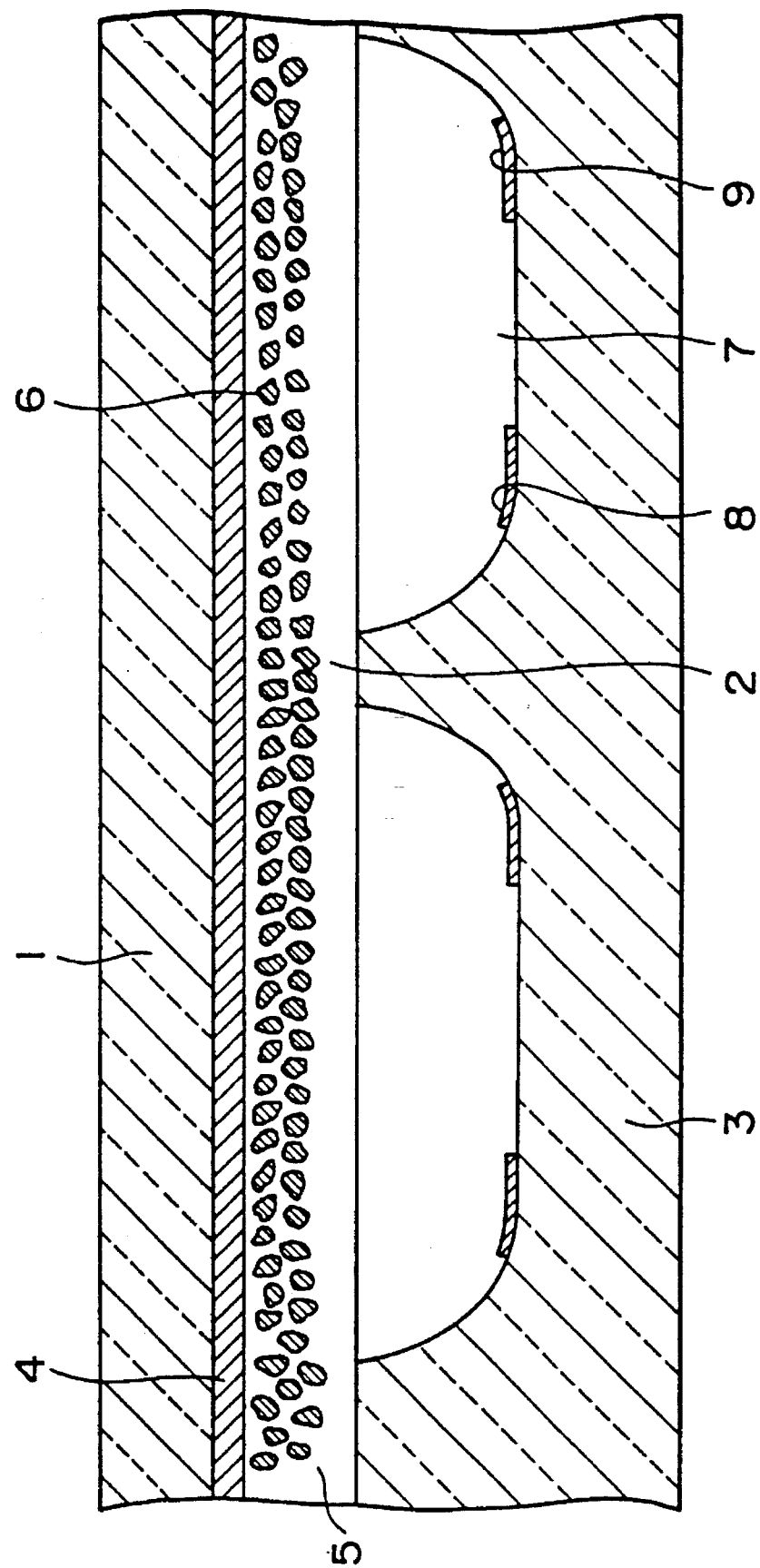

PLASMA-ADDRESSED LIQUID CRYSTAL DISPLAY DEVICE HAVING A TRANSPARENT DIELECTRIC SHEET WITH A POROUS LAYER CONTAINING AN IMPREGNATED LIQUID CRYSTAL

BACKGROUND OF THE INVENTION

This invention relates to a plasma-addressed liquid crystal display device and more particularly, to the structure of a liquid crystal layer. The invention also relates to a method for fabricating a plasma-addressed liquid crystal device.

Plasma-addressed liquid crystal display devices are disclosed, for example, in U.S. Pat. No. 4,896,149 and U.S. Pat. No. 5,077,553 which corresponds to Japanese Published Unexamined (Kokai) Patent Application No. 1-217396. As shown in FIG. 6, the display device has a built-up flat panel structure which includes a liquid crystal cell 101, a plasma cell 102, and a dielectric sheet 103 intervening therebetween. The plasma cell 102 is formed of a lower glass substrate 104 having grooves 105 each in the form of a stripe on the surface thereof. The grooves 105 extend, for example, along the row of a matrix. The respective grooves 105 are hermetically sealed with the dielectric sheet 103 to establish individually separated discharge channels 106. An ionizable gas is filled in each discharge channel. Protruded portions 107 with which adjacent grooves 105 are separated from each other serve as partition walls defining the individual discharge channels 106. Each groove 105 has a curved bottom at which a pair of discharge electrodes 108, 109 are provided in parallel to each other. These electrodes, respectively, function as an anode and a cathode and act to ionize the gas in the discharge channel, thereby generating a plasma. Such a discharge channel serves as a row scanning unit.

On the other hand, the liquid crystal cell is formed of an upper transparent substrate 110. The substrate 110 is disposed in face-to-face relation with the dielectric sheet 103 through a given space, in which a liquid crystal layer 111 is filled. The substrate 110 is formed with data electrodes 112 on the inner surface thereof. The data electrodes 112 are intersected at right angles with the discharge channels 106 and serve, respectively, as column signal units. Thus, there are established matrix-shaped pixels at the intersected portions of the row signal units and the column scanning units.

In the display device having such a structure as set out hereinabove, the discharge channels 106 are line-sequentially changed over and scanned. In synchronism with the scanning, image signals are applied to the data electrodes 112 provided at the side of the liquid crystal cell 101, thereby performing a display drive. When a plasma is generated within a discharge channel 106 selected through the line-sequential scanning. The inside is substantially uniformly turned into an anode potential, thereby effecting pixel selection in every line. More particularly, the discharge channel 106 functions as a sampling switch. When image signals are applied to individual pixels under conditions where the plasma sampling switch is on, sampling hold is performed thereby controlling whether the pixels are turned on or off. After the plasma sampling switch has been turned off, the image signals are held within the pixels.

FIG. 7 is an enlarged, sectional view of an essential part of the known plasma-addressed liquid crystal display device of FIG. 6. The liquid crystal cell 101 and the plasma cell 102 are separated from each other through the intermediate dielectric sheet 103. An image signal voltage which is applied to a data electrode 112 using the anode potential of a selected discharge channel as a reference is capacitively divided by means of the dielectric sheet 103 and is supplied to the liquid crystal layer 111. In order make a great effective drive voltage, it is necessary that the dielectric sheet 103 be as thin as possible and the thickness is set, for example, at approximately 50 μm. The sheet is so thin that it is difficult to keep the complete flatness of the surfaces. The liquid crystal layer 111 is made, for example, of twisted nematic liquid crystals and should be precisely controlled in thickness within a range of 5 μm±0.5 μm. However, since the flatness of the dielectric sheet 103 is not complete, it is very difficult to uniformly control the gap size of the liquid crystal cell over the entire cell frame. In fact, the gap becomes irregular, with the attendant problem that the quality of the resultant image is impeded. In addition, where the twisted nematic liquid crystal is used, the variation of alignment of the liquid crystal molecules which are caused by application of a voltage is taken out as a variation in quantity of transmitted light. For this purpose, polarizing plates 114, 113 are, respectively, bonded to the outer surfaces of the upper and lower substrates 110, 114. By the provision of a pair of the deflecting plates as set out above, a certain rate of incident light is absorbed therewith, with the problem that the transmittance of the picture cannot be increased.

SUMMARY OF THE INVENTION

It is accordingly an object of the invention provide a plasma-addressed liquid crystal display device which has a liquid crystal layer whose thickness is uniform whereby the prior art problems are overcome.

It is another object of the invention to provide a plasma-addressed liquid crystal display device which has an improved image lightness.

It is a further object of the invention to provide a method for fabricating a plasma-addressed liquid crystal display device of the type mentioned above.

According to one embodiment of the invention, there is provided a plasma-addressed liquid crystal display device which comprises:

a first substrate having a plurality of data electrodes formed substantially in parallel on an inner surface thereof;

a transparent dielectric sheet being in contact with the first substrate, the dielectric sheet having a porous layer impregnated with a liquid crystal at an upper side thereof; and a second substrate having a plurality of discharge channels in a direction perpendicular to the data electrodes, the second substrate and a lower side of the transparent dielectric sheet being disposed face-to-face.

As defined above, the plasma-addressed liquid crystal display device of the invention has a built-up structure which includes the first upper substrate, the transparent dielectric sheet brought into intimate contact with the first substrate, and the second lower substrate which is in face-to-face relation with the dielectric sheet. As stated, the first substrate has a plurality of data electrodes, which are parallel to one another, on the inner surface thereof. The dielectric sheet has a porous layer at the upper portion thereof and the porous layer is impregnated with a liquid crystal therein. A plurality of the discharge channels are formed between the lower side of the dielectric sheet and the second substrate. It is preferred that the impregnated liquid crystal consists of a nematic liquid crystal which has a given ordinary ray refractive index, and that the dielectric sheet has substantially the same refractive index as the ordinary ray refractive index.

The plasma-addressed liquid crystal display device having such an arrangement as set out hereinabove can be fabricated according to the following method of the invention.

More particularly, according to another embodiment of the invention, there is also provided a method for fabricating a plasma-addressed liquid crystal display device which comprises the steps of:

subjecting a glass thin sheet material composed at least two components to thermal treatment until phase separation takes place therein, and further subjecting to acid treatment to form a porous layer in the upper portion of the thin sheet material, thereby obtaining a dielectric sheet having the porous layer;

bonding the dielectric sheet at a side opposite to the porous layer to a lower substrate through given spaces therebetween wherein the lower substrate has a plurality of discharge channels extending along one direction; and impregnating a liquid crystal in the porous layer and intimately contacting an upper substrate with the thus impregnated porous layer wherein the upper substrate has been preliminarily formed on the contacted side thereof with a plurality of data electrodes extending along a direction crossing with the one direction. Preferably, the glass thin sheet material consists essentially of borosilicate soda glass. This glass is phase separated into a $Na_2O$—$B_2O_3$ component and a $SiO_2$ component by heat treatment. In this condition, when the glass is subjected to acid treatment, the $Na_2O$—$B_2O_3$ component is selectively dissolved out to provide a desired porous layer.

According to the invention, the porous layer formed in the upper portion of the dielectric sheet is impregnated with a liquid crystal to provide a liquid crystal layer. The thickness of the porous layer can be uniformly controlled over the entirety of the layer, thereby ensuring a uniform thickness of the liquid crystal layer. Even if the dielectric layer is deformed such as by warpage or irregularities, the liquid crystal layer is made constant in thickness. Unlike known counterparts, the upper glass substrate is conveniently brought into mere intimate contact with the dielectric sheet, without need of any gap control means. The liquid crystal impregnated in the porous layer differs from an ordinary twisted nematic mode in that it works in a scattering mode, requiring no polarizing plate. Accordingly, image lightness can be improved.

BRIEF DESCRIPTION OF THE DRAWINGS

FIG. 1 is an enlarged, sectional view of a fundamental arrangement of a plasma-addressed liquid crystal display device according to the invention;

PREFERRED EMBODIMENTS OF THE INVENTION

Figure 2A:
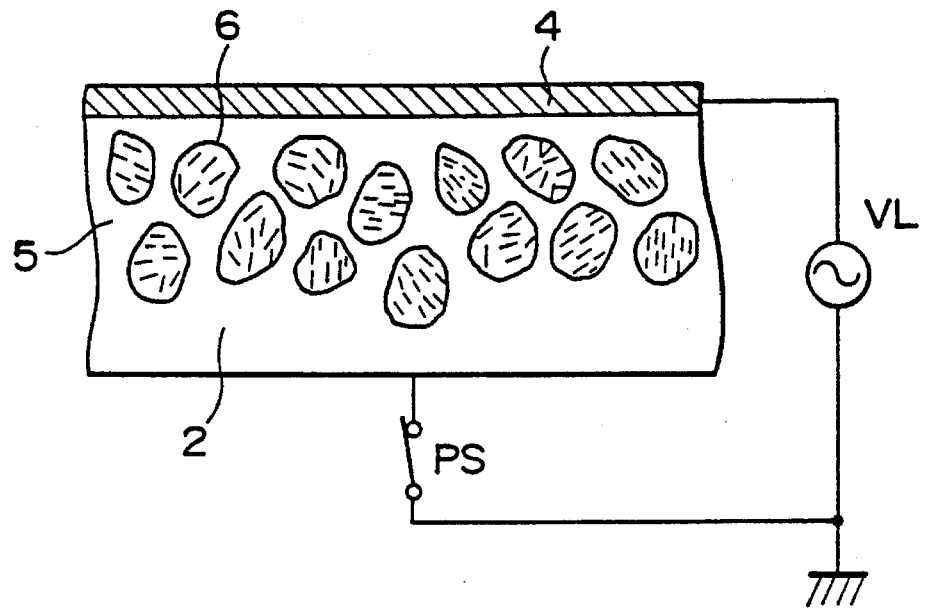
FIGS. 2(A) and 2(B) are, respectively, an illustrative view of operation of the plasma-addressed liquid crystal display device shown in FIG. 1.

Preferred embodiments of the invention are described in detail with reference to the accompanying drawings.

Reference is now made to FIG. 1, which is an enlarged sectional view of an essential part of a fundamental arrangement of a plasma-addressed liquid crystal display device according to the invention. As shown in the figure, the device has a built-up flat panel structure which includes an upper glass substrate 1, a transparent dielectric sheet 2 brought into intimate contact with the substrate 1, and a lower glass substrate 3 disposed in face-to-face relation with the dielectric sheet 2. The upper glass substrate 1 has a plurality of data electrodes 4, which are arranged parallel to one another in a direction, for example, of columns, on the inner surface thereof. The data electrodes 4 are formed, for example, by patterning a transparent conductive film, such as ITO, in the form of stripes. The dielectric sheet 2 has a porous layer 5, which is an integral part of said dielectric sheet, in the upper portion thereof and a liquid crystal 6 is impregnated and held in the integral porous layer 5 so as to form a porous liquid crystal. The dielectric sheet 2 is made, for example, of a glass thin sheet having a thickness of approximately 50 µm. The porous layer 5 has a thickness set, for example at 20 µm. The thickness of the porous layer 5 can be controlled at a given level. It is preferred that the impregnated liquid crystal 6 consists of a nematic liquid crystal which has a given ordinary ray refractive index, and that the dielectric sheet 2 has a refractive index substantially the same as the ordinary ray refractive index. The term "substantially the same as" used herein is intended to mean a difference between the ordinary ray refractive index and a refractive index of not larger than 0.1.

As shown in FIG. 1, the porous liquid crystal formed of porous layer 5 and liquid crystal 6 has a center which is shifted upwardly of a center of said dielectric sheet so that no liquid crystal is present in a lower portion of said dielectric sheet below said porous liquid crystal layer.

The lower glass substrate 3 is disposed in face-to-face relation with the lower side of the dielectric sheet 2 as shown and has a plurality of discharge channels 7 extending along such a direction of rows such that the discharge channels 7 and the data signals 4 are intersected with one another. In the inside of the individual channels 7 which are hermetically sealed, a gas capable of being ionized is filled and a pair of discharge electrodes 8, 9 are provided as shown. One of the paired discharge electrodes 8, 9 serves as a cathode and the other functions as an anode. When an intended discharge channel 7 is selected through line-sequential scanning, a plasma is generated in the inside of the selected channel to establish an approximately anode potential. This discharge channel 7 serves as a row scanning unit and the afore-stated data electrode 4 serves as a column signal unit, thereby establishing a pixel at the intersected portion between the discharge channel and the data electrode.

The operations of the plasma-addressed liquid crystal display device shown in FIG. 1 are described in detail with reference to FIGS. 2(A) and 2(B).

Figure 2B:
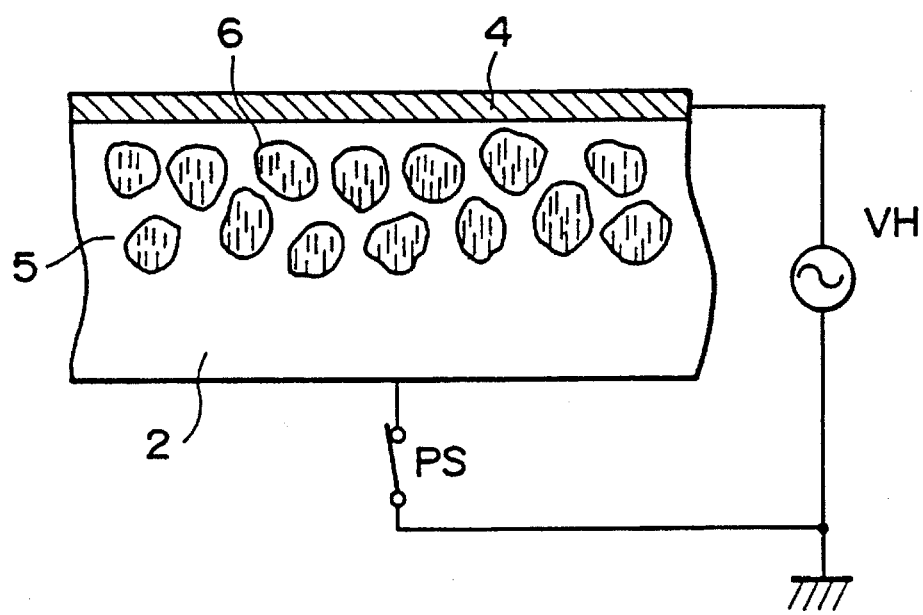

FIGS. 2(A) and 2(B) are, respectively, a schematic view of one pixel portion of the device. As shown in FIG. 2(A), the discharge channel is equivalently indicated as a plasma switch PS. In a selected condition, the plasma switch PS is closed and an anode potential (ground potential) is applied to the lower side of the dielectric sheet 2. On the other hand, a given drive voltage VL is applied to a data electrode 4 in intimate contact with the upper side of the dielectric sheet 2. In the case of FIG. 2(A), the drive voltage VL is smaller than a predetermined threshold voltage. In the case when the liquid crystal 6 impregnated in the porous layer 5 does not respond to the applied voltage, the directors of the liquid crystal molecules are randomly aligned. The average refractive index of the liquid crystal 6 in this randomly aligned state is so set as to differ from the refractive index of the dielectric sheet 2. Accordingly, incident light is scattered by means of the liquid crystal 6 impregnated in the porous layer 5, thereby rendering the pixel opaque.

FIG. 2(B) shows the case where an applied drive voltage VH exceeds the predetermined threshold value. In this case, the directors of the liquid crystal molecules are aligned in the direction of an electric field. In this aligned state, incident light undergoes refraction according to the ordinary ray refractive index of the liquid crystal 6 such as a nematic liquid crystal. In the practice of the invention, the ordinary ray refractive index of the liquid crystal 6 is set so that it is substantially equal to the refractive index of the dielectric sheet 2. Accordingly, incident light suffers little scattering of the liquid crystal 6 impregnated in the porous layer 5, and transmits it as is. This results in a transparent state. As will be apparent from the above, when a desired image signal potential is applied to the data electrode in the condition where the plasma switch PS is closed, the pixel can be switched between the opaque and transparent states. As a matter of course, a half-tone display is possible. When the plasma switch PS is opened, the aligned state of the liquid crystal is maintained as is until a next selection is performed. In this embodiment, a desired image display is effected making use of the light scattering phenomenon of the liquid crystal, requiring no polarizing plate as in the prior art. This eventually leads to an image which has high lightness.

Figure 3A:
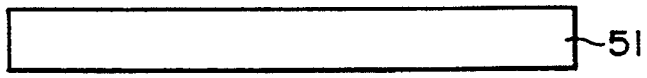
FIGS. 3(A) to 3(E) are, respectively, schematic views showing the fabrication steps of the plasma-addressed liquid crystal display device shown in FIG. 1.

Reference is now made to FIGS. 3(A) to 3(E) to illustrate a method for fabricating a plasma-addressed liquid crystal display device according to the invention. In the step of FIG. 3(A), a glass thin sheet 51 made of at least two components is initially provided. In this embodiment, the glass thin sheet 51 is made of borosilicate soda glass. The glass thin sheet 51 is heated in the temperature range of from 500° C. to 600° C. and is annealed, whereupon it separates into two phases. In the phase-separated state, there is developed such a structure wherein both phases are, respectively, dispersed in a continuous network.

Figure 3B:
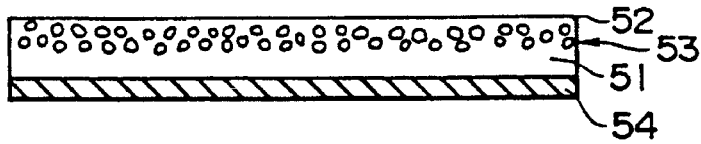

Next, in the step of FIG. 3(B), the sheet 51 is subjected to acid treatment to form a porous layer 52 in the upper portion thereof, thereby providing a dielectric sheet 53. For instance, the phase-separated glass thin sheet 51 is first laminated with an acid-resistant plastic film 54 at the lower side thereof as viewed in the figure, followed by immersion in a sulfuric acid or hydrochloric acid solution having a concentration of approximately 5%. By this, the $Na_2O$—$B_2O_3$ component which is more likely to dissolve in the acid is selectively dissolved out, while leaving the $SiO_2$ component. Thus, there is obtained the dielectric sheet 53 which has a layer wherein a plurality of continuous $Na_2O$—$B_2O_3$ phase-removed holes are provided. The formation of the porous layer 52 is carried out by the simple chemical treatment, making it very easy to uniformly control the layer thickness over its entirety. The used plastic film 54 is then removed.

Figure 3C:
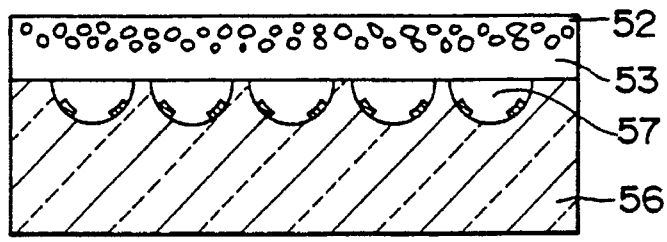

In the subsequent step of FIG. 3(C), a glass substrate 56 is disposed in face-to-face relation with the lower side of the dielectric sheet 53 through given spaces, so that discharge channels 57 are provided between the substrate 56 and the dielectric sheet 53 in the direction of rows as shown. More particularly, the lower glass substrate 56 has a number of grooves in the form of stripes which have been preliminarily formed, such as by etching. In each groove, there is provided a pair of discharge electrodes. The lower glass substrate 56 is bonded to the dielectric sheet 53 at the lower side thereof, such as by frit sealing, to hermetically seal individual grooves. In the respective grooves, a gas capable of being ionized is filled to provide discharge channels 57.

Figure 3D:
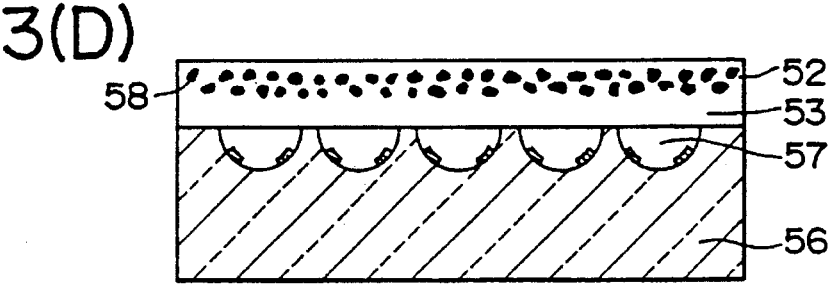

In the step of FIG. 3(D), a liquid crystal 58 is impregnated in the porous layer 52 of the dielectric sheet 53. This impregnation is effected by merely applying the liquid crystal 58 onto the upper side of the dielectric sheet 53.

Figure 3E:
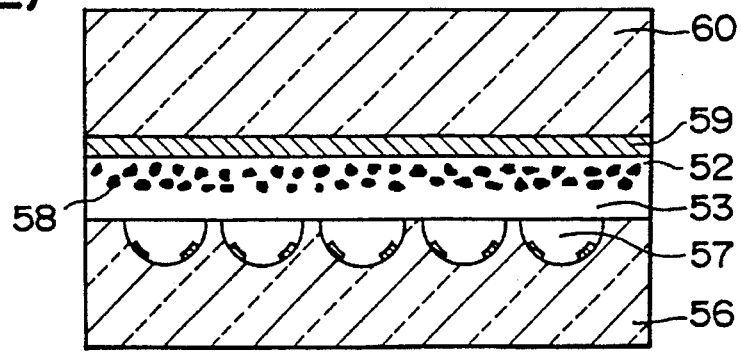

Finally, in the step of FIG. 3(E), an upper substrate 60, having a plurality of data electrodes 59 in the form of columns relative to the rows of the discharge channels 57, is brought into intimate contact with the dielectric sheet 53 as shown, thereby completing a plasma-addressed liquid crystal display device. The upper glass 60 and the dielectric sheet 53 may be intimately contacted by bonding them, for example, through a transparent adhesive.

Figure 4:
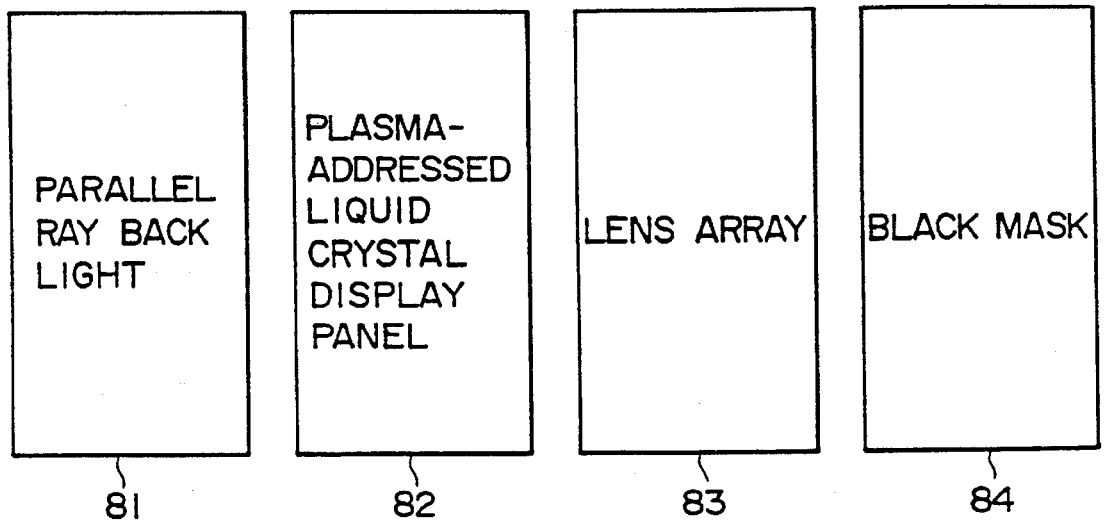
FIG. 4 is a schematic view showing an application of the plasma-addressed liquid crystal display device shown in FIG. 1.

Referring to FIG. 4, an application of an image apparatus which makes use of the plasma-addressed liquid crystal display panel according to the invention is illustrated. As shown in the figure, the image apparatus has a built-up structure which includes a parallel ray back light 81, a plasma-addressed liquid crystal display panel, 82, a lens array 83 and a black mask 84 superposed in this order. The plasma-addressed liquid crystal display panel 82 has such a built-up flat panel structure as shown in FIG. 1 and works in a manner as shown in FIGS. 2(A) and 2(B). The parallel ray back light serves to irradiate substantially parallel illumination rays to the plasma-addressed liquid crystal display panel 82 from the back side of the panel 82. The plasma-addressed liquid crystal display panel 82 selectively scatters or transmits the illumination ray in every pixel depending on the drive voltage being applied thereto. The lens array 83 has a microlens corresponding to the pixels of the display panel 82, and which serves to focus the transmitted light at a focal point. On the other hand, the array 83 does not function to focus the scattered light. The individual microlens of the lens array 83 may not be provided as corresponding to the respective pixels of the display panel 82, but may have an outer diameter as fine as not larger than 1/10 of the pixel array pitch. The black mask 84 is formed by patterning with openings which are in alignment with the focal points of the respective microlens.

Figure 5A:
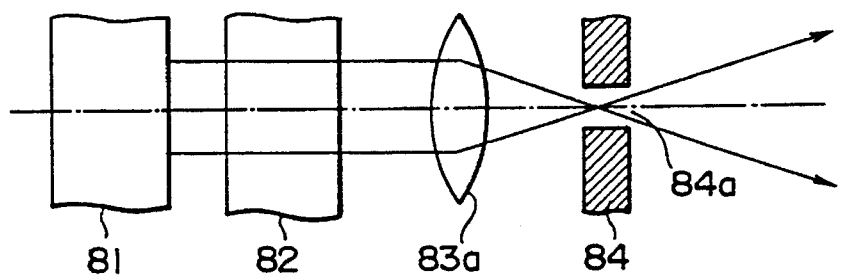
FIGS. 5(A) and 5(B) are, respectively, an illustrative view of the application shown in FIG. 4.
Figure 5B:
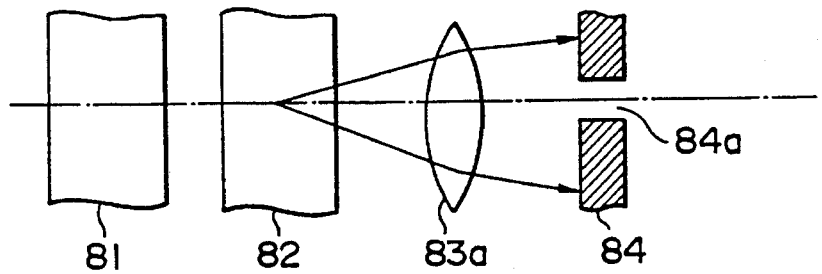
Figure 6:
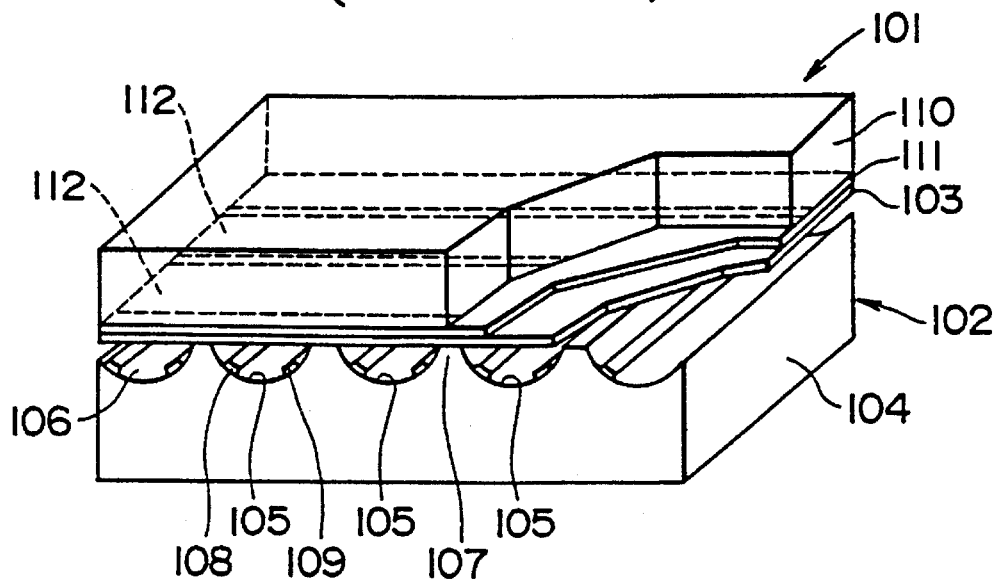
FIG. 6 is a perspective view, partially cut away, of a known plasma-addressed liquid crystal display device.
Figure 7:
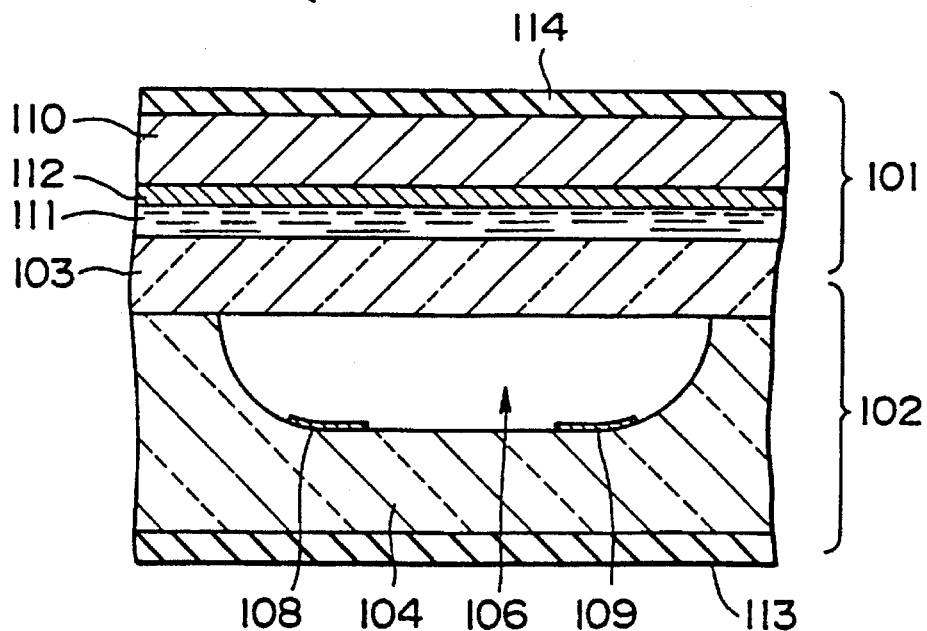
FIG. 7 is an illustrative view for the problem of the known plasma-addressed liquid crystal device.

The operations of the image apparatus of FIG. 4 are described in detail with reference to FIGS. 5(A) and 5(B). FIG. 5(A) shows the case wherein the display panel 82 is in a transmitted state and FIG. 5(B) shows the case wherein the panel 82 is in a scattered state. As shown in FIG. 5(A), when the pixel of the display panel 82 is in a transmitted state in response to a drive voltage which is higher than a predetermined threshold value, the light passed from the parallel ray back light 81 into the liquid crystal layer transmits through the pixel to a corresponding microlens 82a of the lens array in the form of parallel rays. The transmitted light is converged by means of the microlens 83a, thereby forming a minimum scattered circle or spot in the vicinity of the focal point. At the focal point, there is formed an opening 84a of the black mask 84, through which the converged light is efficiently passed to the outside. As will be apparent from the figures, the light passing through the opening 84a is substantially free of the dependence of visual angle. On the other hand, as shown in FIG. 5(B), when the pixel of the display panel 82 is in a light-scattering state, the illumination light is not converged, most of which is cut off by means of the black mask 84. In this manner, there can be realized a direct viewing image apparatus having a very high contrast ratio.

As will be appreciated from the foregoing, according to the invention, the dielectric sheet has a porous layer in the upper portion thereon in which a liquid crystal is impregnated and held. Thus, there is provided a structure wherein the dielectric sheet and the liquid crystal layer are integrally combined, so that the flatness of the dielectric sheet after the panel has been sealed with a frit and filled with a gas adversely influences the irregularities in thickness of the liquid crystal. This enables one to obtain a uniform display over a wide area. The liquid crystal layer impregnated and held in the porous layer of the dielectric sheet works in a light-scattered mode, requiring no polarizing plate, unlike the prior art counterparts. Thus, the lightness of image can be significantly improved.

Although various minor changes and modifications might be proposed by those skilled in the art, it will be understood that I wish to include within the claims of the patent warranted hereon all such changes and modifications as reasonably come within my contribution to the art.

What is claimed is:

1. A plasma-addressed liquid crystal display device, comprising:

a first substrate having a plurality of data electrodes formed substantially in parallel on an inner surface thereof;

a transparent dielectric sheet being in contact with the first substrate, the dielectric sheet having a porous liquid crystal layer which is an integral part of said dielectric sheet impregnated with a liquid crystal in an upper portion thereof, a center of said porous liquid crystal layer being shifted upwardly of a center of said dielectric sheet so that no liquid crystal is present in a lower portion of said dielectric sheet below said porous liquid crystal layer; and a second substrate having a plurality of discharge channels, the first and second substrates being disposed spaced-apart with a direction of the channels transverse to that of the data electrodes, the second substrate and a lower side of the transparent dielectric sheet being disposed in direct face-to-face contact.

2. The display device according to claim 1, wherein said liquid crystal comprises a nematic liquid crystal having a given ordinary ray refractive index and said dielectric sheet has a refractive index substantially equal to said ordinary ray refractive index.

3. The display device according to claim 1, wherein each one of the channels has a pair of electrodes extending along a base portion of the channel.

4. A method for fabricating a plasma-addressed liquid crystal display device comprising the steps of:

subjecting a glass thin sheet material composed of at least two components to thermal treatment until phase separation takes places therein, and further subjecting the thin sheet material to an acid treatment to form an integral porous layer in an upper portion of the thin sheet material, thereby obtaining a dielectric sheet having the porous layer integral therein;

bonding the dielectric sheet at a side opposite to the porous layer directly to a lower substrate at spaced locations defined by a plurality of discharge channels extending along one direction in the lower substrate; and impregnating a liquid crystal in the porous layer to form a liquid crystal porous layer, a center of said porous liquid crystal layer being shifted upwardly of a center of said dielectric sheet so that no liquid crystal is present in a lower portion of said dielectric sheet below said porous liquid crystal layer, forming a plurality of data electrodes on a surface of an upper substrate, and intimately contacting said upper substrate at said surface with the thus impregnated porous layer, said plurality of data electrodes extending along a direction transverse to that of the discharge channels.

5. The method according to claim 4, wherein said glass thin sheet material is comprised of a borosilicate soda glass such that when thermally treated, said glass is separated into a $Na_2O$—$B_2O_3$ phase and a $SiO_2$ phase, and the $Na_2O$—$B_2O_3$ phase is selectively dissolved out by the acid treatment.

* * * * *